May 29, 1934.  E. HEINKEL  1,960,264
CATAPULT FOR LAUNCHING AEROPLANES
Filed Nov. 19, 1932
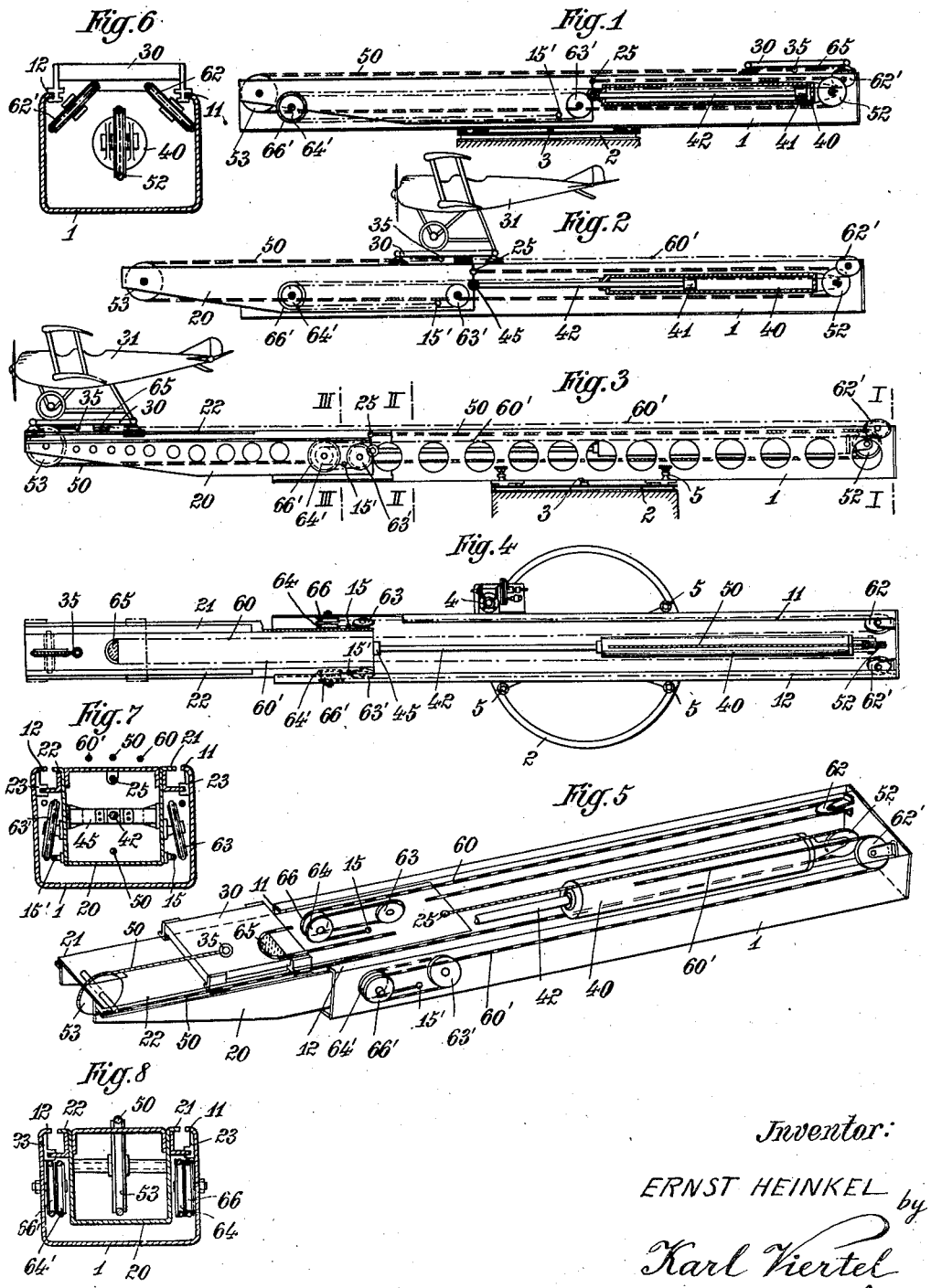
Inventor:
ERNST HEINKEL by
Karl Viertel
Att'y Patented May 29, 1934

1,960,264

UNITED STATES PATENT OFFICE 1,960,264

CATAPULT FOR LAUNCHING AEROPLANES

Ernst Heinkel, Warnemunde, Germany

Application November 19, 1932, Serial No. 643,346
In Germany October 11, 1931

4 Claims. (Cl. 244—2)

My invention relates to aircraft launching apparatus generally known as "catapults" for launching aeroplanes, seaplanes and other aircraft of the "heavier than air" type from places where the available run off is restricted as for example on ships, floating platforms, aerodromes, roofs of buildings etc.; more particularly the invention relates to improvements in catapults of the extensible type in which the aircraft to be launched travels on a trolley, sledge or other carrier along a trackway which can be lengthened or extended in such manner that, when the launching apparatus is at work the length of the extended trackway and the total run of the aircraft carrier is greater than the stowage length of the catapult.

Extensible catapults of various types are known in the art—for example from U. S. Patent 1,797,514 to Richter and U. S. Patent 1,879,768 to Richards, in which the trolley, carrying the aircraft, travels on a "slider"—viz. a trackway structure, slidably mounted on a stationary supporting girder so as to slide thereon in the launching direction, while the trolley travels on top of the slider during the launching action.

In this manner a greater effective over-all trackway length is obtained, which considerably exceeds the track length of the slider proper.

As a matter of fact, known to practitioners, with catapults of this type very powerful, heavy and costly operating means and prime movers, such as compressed air cylinders of great bulk, hydraulic rams etc. are required, in as much as the said slider because of its temporary overhanging position under load relatively to its supporting girder has to be a strong structure, viz. representing a rather heavy mass, which must be quickly accellerated and retarded in addition to the aircraft and its carrier during the launching operation.

With other types of extensible catapults for launching aircraft, known for instance from U. S. Patent 1,777,167 to Forbes, the track way on which the air-craft-trolley travels comprises two or even three track elements, viz. a maintrack structure, which is provided at one or both ends with extending portions, these extensions being slidably arranged relatively to the main track structure or being hinged to the latter, as seen for instance in my own U. S. Patent 1,798,880.

Catapults of this latter type heretofore were not ready for instantaneous use: a relatively long delay is caused by placing the extension member or members into their operative position which is mostly done by hand operated means such as worm gear or the like.

The primary object of this invention is to overcome the drawbacks briefly indicated above, inherent to catapults of known types, by providing an extensible aircraft launching apparatus of structurally improved and sturdy design, which is ready for instantaneous use.

In connection therewith the invention aims at thus designing the aircraft launching apparatus, that the slider element of the trackway is greatly reduced in size and weight, and that in consequence the whole apparatus is less costly to build and to operate than its predecessors.

Other objects of the invention will become incidentally apparent hereinafter to those conversant with the art.

The nature and scope of the invention are briefly outlined in the appended claims and will be more fully understood by the following specification taken together with the accompanying drawing in which Figs. 1–3 are side elevations, partly in section, showing diagrammatically by way of an example a catapult designed according to this invention with its principal parts in three characteristic positions, Fig. 4 is a plan of the catapult, Fig. 5 is a perspective view of the catapult taken from above, Figs. 6–8 are cross sections taken through the catapult along lines I—I, II—II and III—III respectively in Fig. 3.

The catapult of improved design according to my invention of which a typical form is shown in the drawing essentially consists of the following parts: A girder or frame-work structure 1 hereinafter termed main track structure which is open at the top and at its front end, and is rotatably mounted on a turntable, the latter comprising a circular supporting rail 2, a centerpost 3, a training mechanism 4, indicated in Fig. 4, for training around the catapult into the prevailing wind, and clamping screws 5; another girder or frame-work structure 20, hereinafter termed track extension member which is slidably mounted in a telescopic manner within the main track structure 1, sliding in slotted brackets 23, as seen in Figs. 7 and 8; an aircraft carrier 30 which may be of any convenient construction, adapted to carry an aeroplane 31 or other heavier-than-air craft and having a releasing mechanism (not shown) for automatically releasing the aeroplane at the finish of the launching action, said carrier 30 being provided with slotted guide members, illustrated by way of an example in Figs. 5 and 6, so as to be capable of sliding along the upper faces 11, 12 of the main track and those of the track extension members 21, 22; a prime mover for the aircraft carrier 30 and the track extension member 20 comprising a cylinder 40 mounted within the main track structure 1 and a piston 41, designed to be operated by a compressed fluid or an explosive agent and having a rod 42 attached to it which is secured to the track extension member 20 by means of a cross head 45 (Fig. 7);—propelling, retarding and retracting ropes 50, 60, 60' and motion multiplying gears comprising sheaves or pulleys which cooperatively interconnect the said aircraft carrier 30 and the track extension member 20, as will be more fully explained hereinafter; the ropes 50, 60, 60' of said multiplying gears being indicated in Figs. 1–4 by dash lines and dash and dotted lines respectively.

Rope 50 is secured with its front end to the aircraft carrier 30 at 35, as indicated in Fig. 5, while the rear end of the propelling rope 50 is secured at 25 to the track extension member 20.

The motion multiplying gear associated with propelling rope 50 comprises a stationary pulley 52 or sheave attached at the rear end of cylinder 40 and a moveable pulley 53 attached at the front end of the telescopic track extension member 20.

By means of propelling rope 50 and its multiplying gear, cooperatively interconnecting the track extension member 20 and the aircraft carrier 30, the latter is propelled and accelerated with rapidly increasing speed from the rear end of the main track and over the track extension member 20, while the latter is pushed ahead by the piston 41 into its forward position.

As seen in Fig. 5 the front ends of the retarding and retracting ropes 60, 60', indicated by zebra lines, engage the aircraft carrier 30 by a loop 65; the rear ends of said ropes are secured to the side walls of the main track structure at 15, 15' (Fig. 5); motion multiplying gears associated with said ropes 60, 60' comprise two sets of stationary pulleys 62, 62', 64, 64' and 66, 66', all of which being rotatably mounted on the main track structure 1, and one set of moveable pulleys 63, 63', the latter being rotatably mounted in inclined position on the track extension member 20 as seen in Fig. 7.

Retarding an cushioning devices such as rope brakes, springs, dash pots, fluid traps etc., not shown but known in this and other arts and forming no specific part of this invention, may be provided and brought automatically into operation for retarding the piston 41, the track extension member 20 and the air craft carrier 30, as the latter approaches the limit of its outward movement.

Various modifications and changes may be made in the design and cooperation of the component parts and in the structural details of aircraft catapults of the improved type described above, without deviating from the spirit and the salient ideas of my invention.

For example a compressor and air storage tanks or hydraulic power accumulators ready to supply a compressed fluid to the cylinder 40 and to set the catapult into operation at a moments notice may be provided and housed within the enclosed space of the main track structure 1.

Adjusting and compensating devices, such as set screws, right and left hand screw couplings, expanding levers, etc. may be provided to advantage at various points of the motion multiplying gears described above for preventing any of the accelerating, retarding and retracting ropes becoming unduly slack in service.

Instead of using one single cylinder 40 and piston 41 as prime mover a set of two or more cylinders and pistons juxtaposed to each other may be employed for moving to and fro the telescopic track extension member 20 and for simultaneously propelling or retracting the aircraft carrier 30.

Instead of a compressed fluid such as air, gases, water a combustible mixture ignited by an electric spark plug or by a cordite cartridge and a trigger mechanism may be used to advantage.

What I claim is:

1. In an aircraft launching apparatus of the type set forth a main track structure, means for supporting the latter, a track extension member, slidably associated by means of guide members with the main track structure, so as to be capable of travelling relatively thereto in axial direction, an aircraft carrier cooperatively associated by means of guide members with both said tracks, so as to be capable of travelling alternately on the main track and on the track extension member and transitorily on both tracks simultaneously, and power operated propelling means for simultaneously moving to and fro the said track-extension member and aircraft carrier.

2. In an aircraft launching apparatus of the type set forth a main track structure, means for supporting the latter, a track extension member, slidably associated by means of guide members with the main track structure, so as to be capable of travelling relatively thereto in axial direction, an aircraft carrier cooperatively associated by means of guide members with both said tracks, so as to be capable of travelling alternately on the main track and on the track extension member and transitorily on both tracks simultaneously and power operated propelling means for simultaneously moving to and fro the said track-extension member and aircraft carrier, said supporting means comprising a turntable allowing the said main track structure to be trained into the wind.

3. In an aircraft launching apparatus of the type set forth a main track structure, means for supporting the latter, a track extension member, slidably associated by means of guide members with the main track structure, so as to be capable of travelling relatively thereto in axial direction, an aircraft carrier cooperatively associated by means of guide members with both said tracks, so as to be capable of travelling alternately on the main track and on the track extension member and transitorily on both tracks simultaneously and power operated propelling means for simultaneously moving to and fro the said track-extension member and aircraft carrier, said propelling means comprising a cylinder, attached to the main track structure, a piston within said cylinder, a piston rod attached to the track extension member, and multiplying gears cooperatively interconnecting the said aircraft carrier, main track structure and track extension member.

4. In an aircraft launching apparatus of the type set forth a main track structure, means for supporting the latter, a track extension member, slidably associated by means of guide members with the main track structure, so as to be capable of travelling relatively thereto in axial direction, an aircraft carrier cooperatively associated by means of guide members with both said tracks, so as to be capable of travelling alternately on the main track and on the track extension member and transitorily on both tracks simultaneously and power operated propelling means for simultaneously moving to and fro the said track-extension member and aircraft carrier,—said propelling means comprising a double acting cylinder, attached to the main track structure, a piston within said cylinder, a piston rod attached to the track extension member, and two sets of rope multiplying gears cooperatively interconnecting the said aircraft carrier, main track structure and track extension member.

ERNST HEINKEL.